United States Patent

Church et al.

[11] 3,722,939
[45] Mar. 27, 1973

[54] VEHICLE BUMPER MOUNT CONSTRUCTION

[75] Inventors: Herman S. Church, Cuyahoga Falls; James L. Hagener, Canton, both of Ohio

[73] Assignee: Teledyne Mid-America Corporation, Hartville, Ohio

[22] Filed: Nov. 23, 1971

[21] Appl. No.: 201,335

[52] U.S. Cl. ...................293/88, 267/63 A, 213/8
[51] Int. Cl. ..............................................B60r 19/06
[58] Field of Search ............213/8, 40 R, 40 S, 40 D; 267/63 A; 293/88

[56] References Cited

UNITED STATES PATENTS

| | | | |
|---|---|---|---|
| 1,810,717 | 6/1931 | Lord | 293/88 X |
| 3,457,729 | 7/1969 | Wanneroy | 61/48 |
| 3,565,265 | 2/1971 | Thomas | 213/8 |

Primary Examiner—Drayton E. Hoffman
Assistant Examiner—Robert Saifer
Attorney—John H. Bishop et al.

[57] ABSTRACT

A vehicle bumper mounting construction formed of a generally elongated box-like housing member enclosing a portion of an elongated beam member generally H-shaped in cross section, one or more pairs of rubber pads having parallel surfaces are bonded, one surface to the web of the H-beam member and the other surface to the inside surface of the side walls of the housing. The housing member is provided with means for mounting the assembly to the frame of an automobile and the H-beam is provided with a mounting flange for attaching an automobile bumper to the assembly. Impact energy applied to the bumper is absorbed by the construction by deflection of the H-beam placing shear stress on the pairs of rubber pads.

15 Claims, 14 Drawing Figures

INVENTORS.
HERMAN S. CHURCH &
JAMES L. HAGENER

*Frease & Bishop*
ATTORNEYS

INVENTORS.
HERMAN S. CHURCH &
JAMES L. HAGENER

*Frease & Bishop*
ATTORNEYS

Patented March 27, 1973 3,722,939

INVENTORS.
HERMAN S. CHURCH &
JAMES L. HAGENER

*Frease & Bishop*
ATTORNEYS

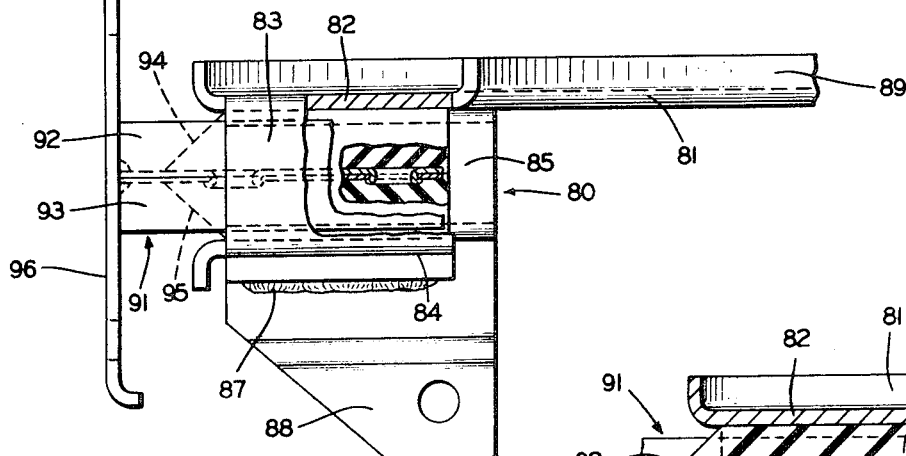
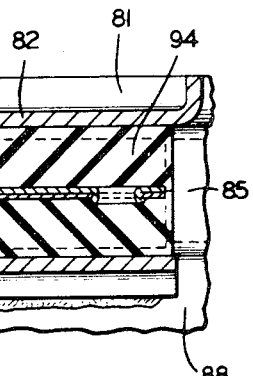
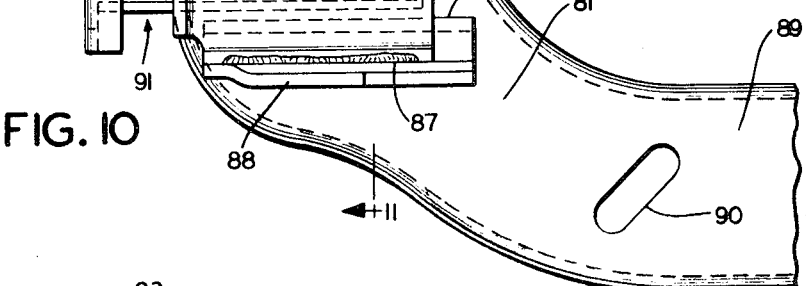
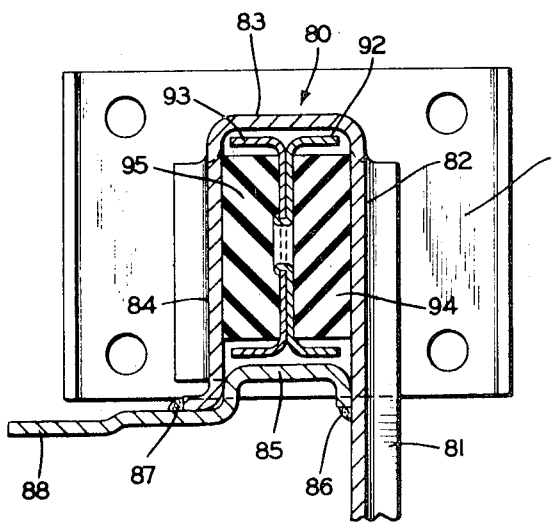

VEHICLE BUMPER MOUNT CONSTRUCTION

BACKGROUND OF THE INVENTION

1. Field of the Invention

The invention relates to vehicle bumper mount constructions of the energy absorbing type and particularly the invention relates to energy absorbing automobile front and rear bumper mounting means employing rubber in shear as the energy absorbing member.

2. Description of the Prior Art

It is relatively common knowledge that minor automobile collisions frequently result in extensive damage to the automobile in relation to the seriousness or magnitude of the collision. Accidents which occur at velocities in the range of 5 to 10 mph can lead to repair bills of several hundred dollars or more. A major reason for such extensive damage at low velocity is that modern automobile bumpers are unable to absorb the impact energy of a low velocity collision without damaging either the bumper itself or adjacent vehicle elements, such as head or taillights, radiators, fuel tanks, fenders and the like.

In fact, the problem is so serious that certain insurance companies have advertised premium rate reductions of substantial amount for owners of automobiles equipped to withstand 5 to 10 mph impacts without damage to the automobile. Further, federal law will, in 1973, require automobiles to withstand 5 mph collisions without damage to safety related equipment, such as headlights and taillights, and more stringent requirements are scheduled for following years. The desirability, from an economic standpoint, of providing improved bumper constructions has been, therefore, reinforced by the requirements of federal law.

A considerable number of bumper mount constructions have been proposed to overcome the above mentioned problems. For example, one such mount includes a tubular type member mounted on the vehicle frame with an annular-shaped, thick-walled rubber member secured to the inner cylindrical wall and a rod secured to the inner surface of the rubber member in telescope-like fashion. Energy of impact may be absorbed by longitudinal movement of the rod causing distortion of the rubber member secured between the rod and the inner cylindrical surface. Such construction is shown in Lord U.S. Pat. No. 1,810,717. A modification of this structure involves mounting the bumper on a shaft that is slidably located in a resilient bushing. The shaft includes protrusions or enlargements which deform the bushing to thereby absorb the energy of impact imparted to the sliding shaft. Other more complicated resilient type constructions have been proposed for bumper mounts and other bumper constructions have been built in an effort to minimize the damage to automobiles involved in low velocity collisions.

However, difficulties of one sort or another have attended these prior constructions. For example, automobiles are almost universally supplied with a jack for use in repairing tires. In most cases these jacks are designed to lift either the front or rear of the automobile by engagement with the bumper. Both of the above-mentioned bumper mount constructions are not suited for use with a bumper jack. The resiliency of the rubber member would cause instability of the automobile body if it were successfully lifted, or damage to the rubber element could in many cases result from raising the automobile body with a bumper type jack. Thus, the convenience of the bumper jack use to the average motorist, who from time to time must repair an automobile tire, is of necessity eliminated when constructions of this type are used.

Accordingly, it is a general object of the present invention to provide an improved vehicle bumper mount construction that absorbs, without vehicle damage, impact energy of low velocity vehicle collisions. Other objectives include the provision of a mount construction which does not sacrifice other convenient or safety features of the automobile; the provision of a bumper mount construction which is adaptable for use in a wide variety of models and styles for use in a large variety of models of commercially available automobiles; and the provision of a bumper mount construction which is easily and economically manufactured without adding undue cost elements to the vehicle over rigid type mounting constructions.

These and other objects, apparent from the drawings and from the following summary and description, may be obtained, the difficulties overcome, and the advantages and results achieved by the constructions of the present invention, preferred embodiments of which, illustrative of the best modes which applicants have contemplated, are set forth in detail in the description below and illustrated in the accompanying drawings.

SUMMARY OF THE INVENTION

The invention may be described in general terms as a bumper mount construction which includes a generally box-like housing member including means for attaching the housing to the frame of an automobile. The mount construction also includes a beam, either H-shaped in cross section or of the I-beam type, having one or more pairs of rubber pads bonded to the web of the beam. The beam and bonded rubber pads are mounted within the housing member with the outer surface of the pads post-bonded (that is after vulcanization) to the side wall surfaces of the housing, the web of the beam being preferably located in a vertical plane. A portion of the I-beam extends beyond the box-like member and is provided with means for mounting an automobile bumper.

BRIEF DESCRIPTION OF THE DRAWINGS

FIG. 9 is a top plan view of the third embodiment of the bumper mount construction of the present invention with some parts broken away;

FIG. 10 is a side elevation of the bumper mount construction of FIG. 9;

FIG. 11 is a vertical cross section of the bumper mount construction of FIGS. 9 and 10 taken on the line 11—11, FIG. 10;

FIG. 12 is a horizontal cross section of the bumper mount construction of FIGS. 9 to 11 taken on the line 12—12, FIG. 10;

Similar numerals refer to similar parts throughout the various figures of the drawings.

DESCRIPTION OF THE PREFERRED EMBODIMENTS

Figure 1:
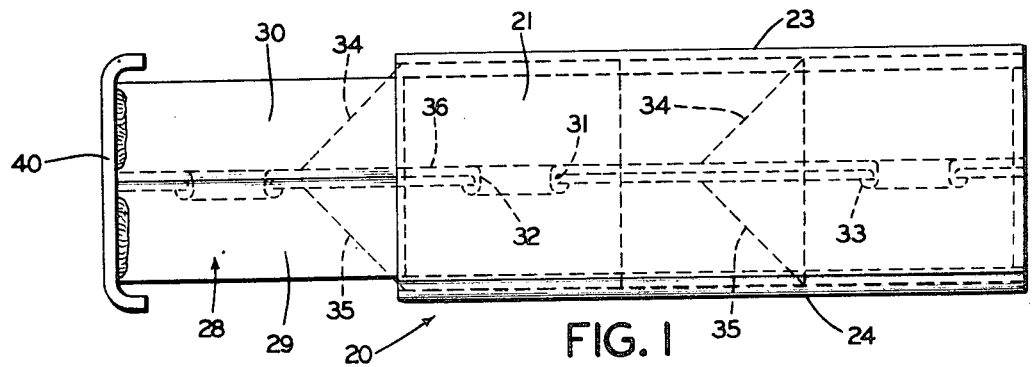
FIG. 1 is a top plan view of the vehicle bumper mount construction of the present invention showing one embodiment of the invention in at-rest, no-load position.

In the drawings three embodiments of the bumper mount construction of the present invention are illustrated to show the versatility of the principals of the invention to adapt the same to specific situations.

The first embodiment of the present invention is shown in FIGS. 1 through 1 and is preferably used to mount an automobile front bumper. The second embodiment, shown in FIGS. 5 through 8 is preferably used for mounting the rear bumper of an automobile. The third embodiment, shown in FIGS. 9 through 12 can be used for either front or rear bumper mountings.

Figure 2:
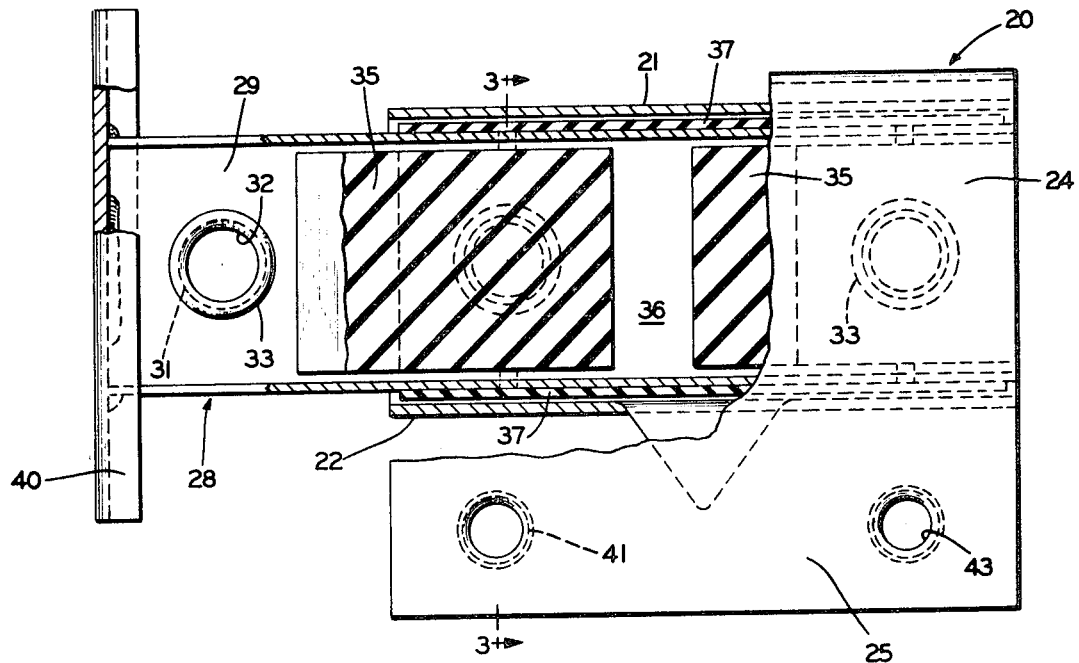
FIG. 2 is a side elevation partly in cross section of the bumper mount construction of FIG. 1 with a portion of the mounting bracket broken away to show the energy absorbing members.
Figure 3:
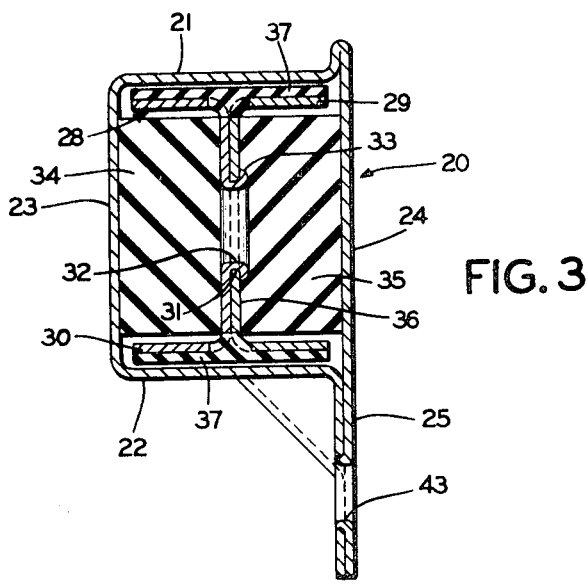
FIG. 3 is a vertical cross section of the bumper mount construction of FIGS. 1 and 2 taken on the line 3—3 in FIG. 2.
Figure 4:
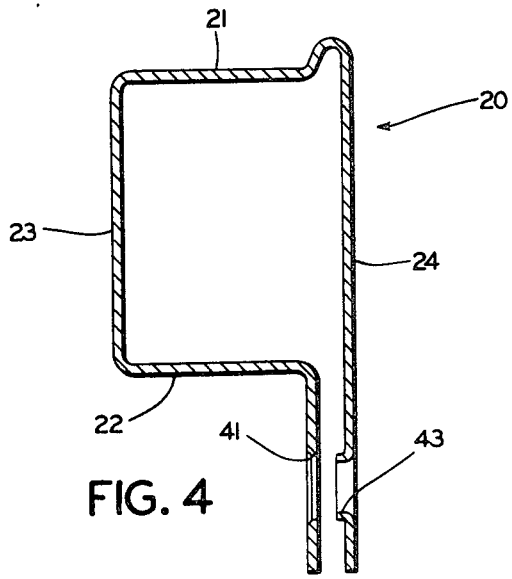
FIG. 4 is a vertical cross section of the mounting bracket of the bumper mount construction of FIGS. 1 through 3 shown prior to final assembly and bonding of the energy absorbing members.

Referring now to FIGS. 1 through 4, the construction includes a generally rectangular box-like housing member 20 having top wall 21, bottom wall 22, first side wall 23 and second side wall 24. The side walls 23 and 24 are approximately parallel to each other. Mounting flange 25 may be provided by bending bottom wall 22 downwardly and extending side wall 24 a distance below bottom wall 22 and by attaching the two together, as for example, by flaring sleeve 43 which extends through hole 41 formed in the bent down portion of bottom wall 22. FIG. 4 illustrates the box-like housing member of this embodiment prior to the assembly and FIG. 3 shows the device in assembled position. The method of assembly and a more detailed description of mechanical joining methods will follow.

The construction of the present invention also includes a generally H-shaped elongated beam-like member 28 which is composed of two channel members 29 and 30 which may be formed from flat plates of steel or the like. The two channels may be fastened together in a manner similar to the assembly of the housing 20 by providing a series of holes 31 on one of the channels and a corresponding series of sleeves 32 which may be flared at 33 to attach channels 29 and 30 to one another.

In accordance with the present invention a pair of rubber pads 34 and 35 are bonded to the web 36 of H-beam 28 formed by the mating portions of channels 29 and 30. These pads may be bonded to the metal during vulcanization of the rubber. A pair of elongated sheets of resilient material may also be bonded to the top and bottom of beam 28 as at 37 to minimize any noise that may result from road-induced vibration when the assembly is mounted on an automobile.

Rubber pads 34 and 35, as seen in plan view in dotted line in FIG. 1 have a general trapezoidal configuration. Thus, the surface bonded to beam member 28 will be greater in area than the surface bonded to housing 20. Such configuration provides a non-linear energy absorption characteristic upon deflection as will be discussed more in detail below during description of FIGS. 13 and 14. The construction of the present invention also includes a mounting flange 40 attached to the outward end of beam 28. Flange 40 is adapted to be attached to the bumper of an automobile or other vehicle with which the device of the present invention is to be used.

In accordance with the present invention, housing 20 is mounted on the frame of an automobile, or other vehicle, for example, by bolting flange 25, through holes 41 through corresponding holes provided on the automobile frame at a suitable location. A bumper (not shown) mounted on flange 40 is carried by the energy absorbing device of the present invention and pads 34 are mechanically interposed between the automobile bumper and the automobile frame to absorb impact energy.

FIG. 4 illustrates the partially finished housing member 20 in the initial stage of the assembly of the device of the present invention. The assembly procedure for the entire device shown in FIGS. 1 through 4 includes first, providing the pair of channels 29 and 30. One of the pair of channels 29 has a series of holes 31 formed through the web or base portion of the channel. Channel 30 is provided with a series of stamped or extruded sleeves or bosses 32 which correspond in location to the location of holes 31. The outer diameter of sleeves 32 is approximately equal to the diameter of holes 31. The two channels are placed back to back or base to base with sleeves 32 extending through holes 31, the length of sleeve 31 being somewhat greater than the thickness of the metal from which channel 29 is formed. By any suitable machining operation the outer end of sleeve 32 is flared as at 33 to securely fasten channel 29 and 30 to one another, to form an H-shaped beam from two originally flat plates of metal.

Next, the two pair of rubber pads 34 and 35 are vulcanized to the web 36 formed by the back to back base of channels 29 and 30. At this point, in the assembly procedure, rubber sheets 37 may also be attached or bonded to the channel during the vulcanization process. Beam member 28 with attached pairs of rubber pads 34 and 35 are then placed in the partially formed housing member 20, as shown in FIG. 4, with suitable adhesive material being placed on the inner surfaces of side walls 23 and 24 and the outer surfaces of pads 34 and 35. The outer surface of pads 34 and 35 will mate with and abut the inner surfaces 23 and 24 of housing 20 and are bonded to the housing. The partially assembled beam and housing may then be placed in a press or other suitable device to press side wall 24 towards side wall 23. In the process rubber pads 34 and 35 are pressed under compression, and housing 20 may be held in assembled portion as shown in FIG. 3 by flaring the outer ends of sleeves 43 which extend through holes 41, in a manner similar to the assembly of channels 29 and 30.

Bumper mounting flange 40 may be attached to the outer end of beam 28 which extend out of housing 20 by any suitable means as for example, by welding, as is shown in the drawings.

The second embodiment of the present invention is illustrated in FIGS. 5 through 8 and 14 and is preferably used for mounting the rear bumper of an automobile. The bumper mount construction of FIGS. 5 through 8 includes a housing generally indicated at 50 which is formed from lower plate 51 and housing channel 52. Housing channel 52 includes a top wall 53 and side walls 54 and 55 extending downwardly from top wall 53 and bottom flanges 56 and 57 which extend outwardly from side walls 54 and 55, respectively. The bottom plate 51 is attached to flanges 56 and 57 by any convenient means, as for example, by welding or by the extruded sleeve-hole method described above.

The construction also includes beam member 58 which is formed from attaching to generally U-shaped channels 59 and 60 back to back by the hole-extruded sleeve method, described above in reference to beam 28.

In accordance with the present invention, two pairs of rubber pads 61 and 62 are bonded to the web 63 of channels 59 and 60 on their inner surfaces. The outer surface of pad 61 is bonded to the inner surface of top wall 53 of housing 50 while the outer surface of pad 62 is bonded to the exposed inner surface of bottom plate 51.

Flanges 56 and 57 may have one or more holes 64 formed therethrough to provide a means for attaching the energy absorbing device to the automobile frame. Likewise, a pair of brackets 65 may also be welded to the side walls 54 and 55 and flanges 56 and 57 to provide additional mounting means or for other desired purposes. A bumper mounting bracket 67 may be welded to the outer end of beam 58 upon which the rear bumper of an automobile may be mounted.

Figure 6:
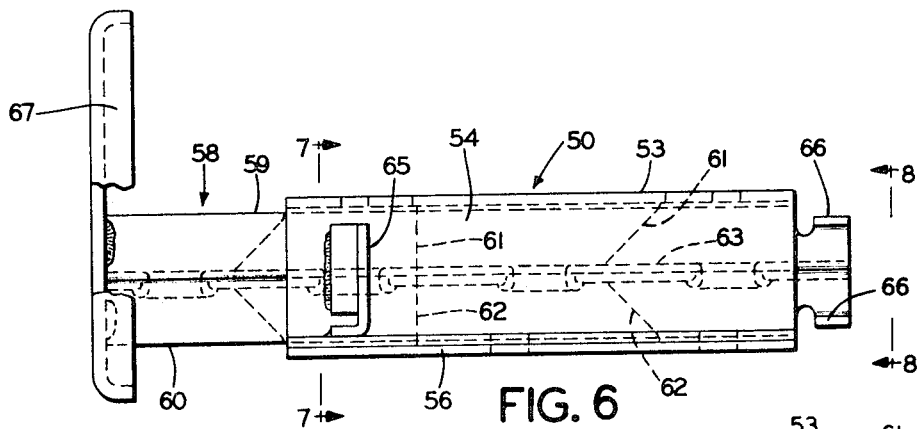
FIG. 6 is a side elevation of a bumper mount construction of FIG. 5.
Figures 7, 8:
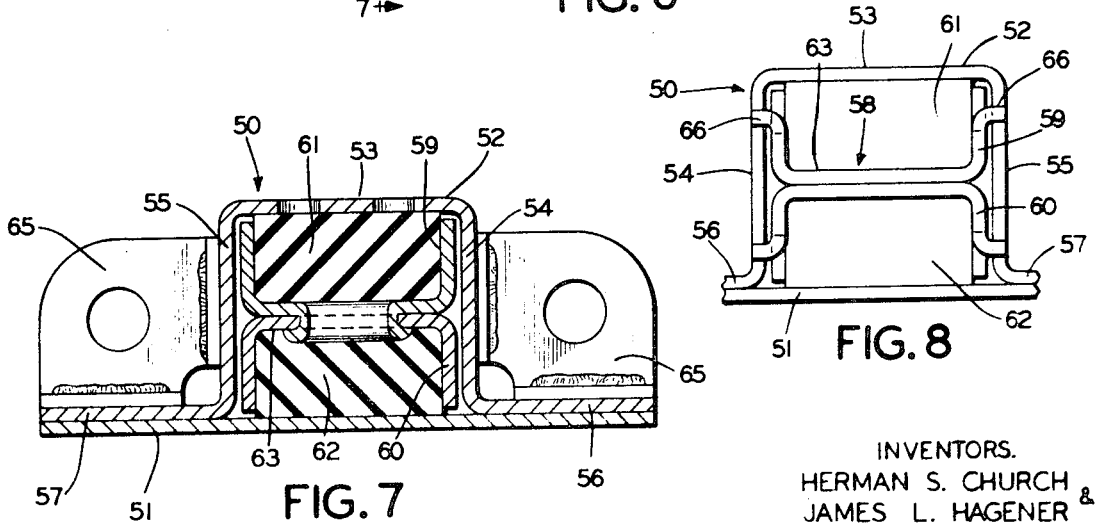
FIG. 7 is a vertical cross section of the bumper mount construction of FIGS. 5 and 6 taken on the lines 7—7, FIG. 6.
FIG. 8 is a rear elevation of bumper mount construction of FIGS. 5 to 7 taken in the direction of the arrows 8—8, FIG. 6.

Rubber pads 61 and 62 have a generally trapezoidal vertical cross section shape, as seen in dotted lines in FIG. 6. Thus, the surface bonded to beam member 58 will be greater in area than the surface bonded to housing 50. This configuration, as in the first embodiment, provides a nonlineal energy absorption characteristic upon deflection.

It is common practice today to mount trailer hitches to the rear bumpers of automobiles and smaller trucks for towing small trailers and other similar vehicles for the convenience of the automobile owner. In order that the load of such towed vehicles is not borne by the rubber energy absorbing pads for extended periods of time, the inboard end of beam 58 is provided with four out-turned ears 66 which engage the inside end of housing side walls 54 and 55 upon deflection of beam 58 outwardly from the housing to transmit the load directly from the beam to the frame of the vehicle through the housing.

The third embodiment of the present invention is illustrated in FIGS. 9 through 11 and is particularly adapted to mount an automobile bumper where the location of the bumper is at a different distance above the road surface than the position on the automobile frame on which the device is to be attached. This embodiment includes a housing generally indicated at 80 formed from housing plate 81 which includes side wall 82, top wall 83 and side wall 84 which is generally U-shaped in cross section as seen in FIG. 11. The bottom of the housing is closed by bottom plate member 85 which is welded to side wall 82 and side wall 84, as indicated at 86 and 87, respectively. Bottom wall flange 88 may extend outwardly from the bottom plate 85 to aid in mounting the device to the frame of an automobile. Side wall 82 also includes a downwardly and rearwardly-extending mounting bracket 89 which may include holes as at 90, likewise to provide a means for attaching the device to the frame of an automobile.

The construction also includes beam 91 formed by back-to-back attachment of channels 92 and 93 by any convenient method, as for example, by the extruded sleeve-hole method referred to above in discussing the first and second embodiment of the present invention.

A pair of rubber pads 94 and 95 are bonded to the web of beam member 91 and the beam with pads is located within housing 80 and the pads bonded on their outer surfaces to the inner surfaces of side walls 82 and 84. A bumper mounting bracket 96 is welded to the outer end of beam 91 and is provided with means for mounting an automobile bumper thereto.

As seen best in FIG. 10, the position of a bumper mounted on bracket 96 will be offset a distance from the position that the device is mounted to the automobile frame by mounting bracket 89. This distance is dictated by the design of the automobile, including the position of the automobile frame as well as the optimum distance desired above road level for the location of the bumper.

Pads 94 and 95, shown in dotted lines in FIG. 9 and also in section in FIG. 12, are generally trapezoidal in cross section to provide a nonlinear road-absorbing characteristic on deflection of beam 91.

In the first and third embodiments described, the beam members to which the rubber pads are bonded are illustrated with their web located in a generally vertical direction. The flanges of the beam are generally located closely adjacent to the top and bottom walls of the respective housings of the embodiments. On the other hand, the web of the beam shown in the second embodiment (FIGS. 5 through 8) is illustrated as lying in the generally horizontal position. The outer edges of the beam flanges are adjacent to the top and bottom of the housing in the second embodiment. One of the desirable characteristics in the modern automobile is that it be capable of being lifted at the front or the rear of the automobile by a bumper jack. With the device of the present invention, an automobile may be conveniently lifted without placing undue stress upon the rubber energy-absorbing members. This is accomplished by slight vertical movement of the outer end of the beam within the housing. The flange of the beam will abut the inside top surface of the housing and transmit the weight of the automobile from the beam, which carries the bumper, to the housing and thus the automobile frame. The load or weight of the automobile will be only slightly imparted to the rubber energy-absorbing pads, and not to a degree sufficient to either damage the bond between the metal beam or the housing and the rubber surfaces of the pads bonded thereto.

Figure 13:
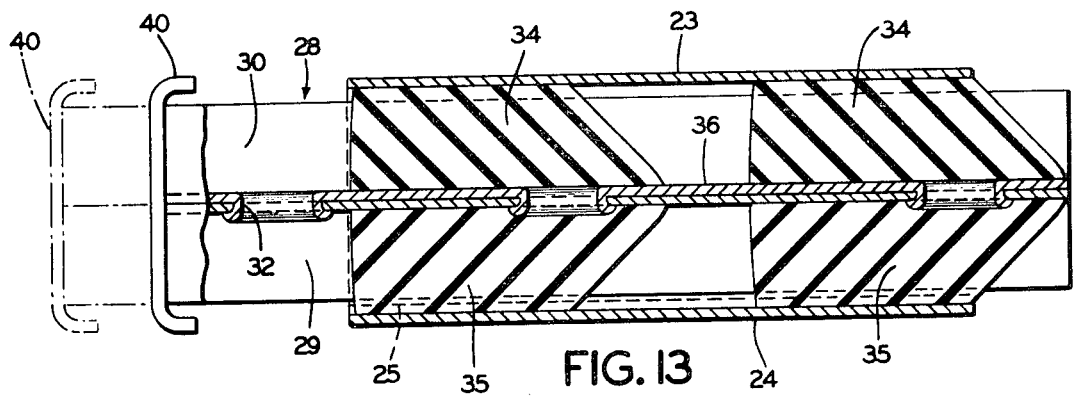
FIG. 13 is a horizontal cross section of the bumper mount construction of FIGS. 1 through 3 showing in full line the position of the relative components under loaded conditions.
Figure 14:
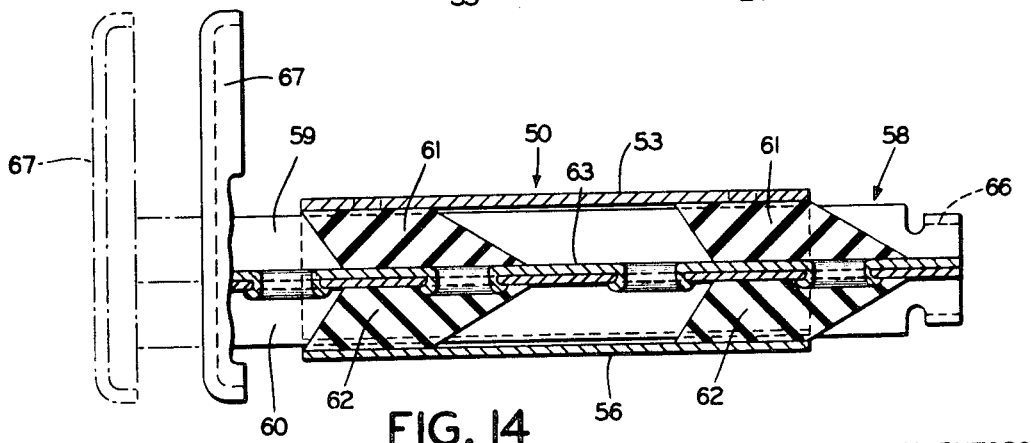
FIG. 14 is a vertical cross section of the bumper mount construction of FIGS. 5 through 8 showing the relative position of the components under loaded condition.
Figure 5:
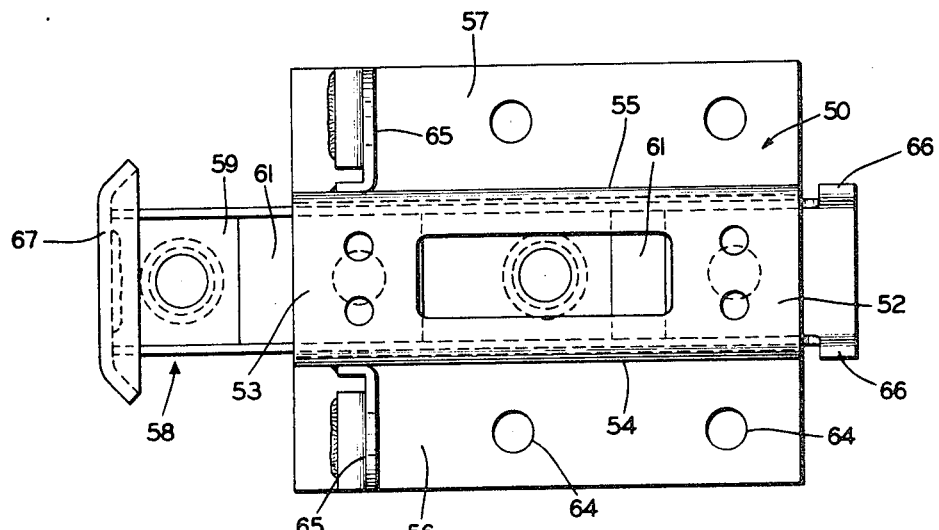
FIG. 5 is a top plan view of a second embodiment of the bumper mount construction of the present invention particularly adapted to mount the rear bumper of an automobile.

The manner in which energy caused by impact is absorbed by the first and second embodiments of the present invention is generally illustrated in FIGS. 13 and 14. The third embodiment operates in a manner similar to that illustrated for the first and second embodiments in FIGS. 13 and 14. The "at rest" position of the energy-absorbing device is shown in dotted lines in both FIGS. 13 and 14. The position of the beam at impact with respect to the housing, as well as the position of the respective rubber pads are shown in full lines. Impact applied to the bumper of the automobile will cause longitudinal movement of the beam within the housing. This will cause distortion and compression of the rubber members approximately to the position shown. The compression is caused by the excess rubber from the trapezoidal shape being squeezed between the side walls of the housing. The energy of impact is absorbed by the compression, distortion and elasticity of the rubber members. After the load is removed from the automobile bumper the beam will return to the "at rest" position shown in dotted lines in FIGS. 13 and 14 or in full lines in FIGS. 1 through 8.

The amount of energy which a device of the present invention may absorb can be predetermined for a particular distance of beam deflection. Therefore, if, for example, the device of FIGS. 1 through 3 is to absorb more energy upon the impact of a given dimension than as shown in the drawings, the respective shape of the rubber pads can be varied, the number of pads used can be increased, and the compressive load under which the pads are mounted within the housing can be increased to provide additional load absorbing capabilities. Consequently, the device of the present invention can be used within a wide variety of parameters without departing from the principles of the present invention.

As an example of the energy-absorbing characteristics of the device of the present invention, it has been calculated that a device in a −40° F. environment mounted on a standard-sized automobile will upon five mile per hour impact raise the temperature of the rubber pads to approximately room temperature. This rise in temperature within the rubber pads is caused by the absorption of the impact energy by the rubber members transforming it into heat within the rubber pad elements.

The cross-sectional load bearing shape of the rubber pads illustrated in all three embodiments in the drawings is of trapezoidal form. However, it it not necessary within the scope of the present invention to adhere strictly to such shape. For example, rubber pads which are rectangular or square in cross section will perform equally well. The only difference between shapes of different configuration will be the load deflection characteristic of the construction, and in some cases it may be desirable to use such rectangular or square cross-sectional shape. In any event, the load absorbing characteristic of the device of the present invention, irrespective of the shape of the rubber energy absorbing members, results from the longitudinal deflection of the beam placing shear stress on the rubber members.

In the first embodiment of the present invention the rubber strip 37, bonded to the top and bottom of beam 28, provides a means for reducing noise from road induced vibrations imparted to the vehicle. Such rubber insulation, although not illustrated, can be employed in any or all of the embodiments of the present invention to reduce or eliminate noise which may be caused by repeated contact of metal-to-metal members. This may be particularly important since the housing member and beam member are formed from metal or metal components the clearance between two or more metal members is very close, and since the beam is carried in the housing by an elastic device, vibration may cause the adjacent metal members to contact one another.

Each of the embodiments of the present invention contemplate the provision of a bumper mounting device in which the member upon which the bumper is directly mounted is carried on the frame of the vehicle with one or more energy absorbing members interposed mechanically between the bumper and the vehicle frame. Furthermore, each of the embodiments provides a construction whereby the device is capable of carrying the weight of the vehicle as would be encountered when raising either the front or rear of the vehicle by the bumper, without adversely affecting the bond between the rubber member and the elements to which the rubber is bonded.

In the foregoing description certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is not limited to the exact details of the embodiments shown or described.

Having now described the features, discoveries and principles of the invention, the manner in which the embodiments of the improved bumper mounting construction may be made, the characteristics of the new constructions, and the advantageous, new and useful results obtained; the new and useful structures, devices, elements, arrangements, parts and combinations are set forth in the appended claims.

We claim:

1. Vehicle energy absorbing bumper mount construction including an elongated housing having top and bottom walls and opposite side walls and open at each end, an elongated beam of generally H-shaped cross section, located within the housing and having a web portion spaced between the opposite side walls and top and bottom flanges spaced closely adjacent to the housing top and bottom walls respectively, a portion of the beam extending from the interior a distance beyond one open end of the housing, the other end of the beam being located adjacent to the other open end of the housing; energy absorbing elastic members bonded to opposite surfaces of the web and to the inside surfaces of the housing side walls, the elastic members mounting the beam within the housing, means for attaching the housing to the frame of a vehicle and means for attaching a vehicle bumper to the end of the beam extending beyond the interior of the housing.

2. Energy absorbing bumper mount construction as defined in claim 1 in which the energy absorbing members are rubber pads having two opposite surfaces, one of said surfaces bonded to a web surface and the opposite surface bonded to one of the inside surfaces of the housing side wall.

3. Energy absorbing bumper mount construction as defined in claim 2 in which said energy absorbing members are a plurality of pairs of rubber pads spaced substantially along the length of the housing.

4. Energy absorbing bumper mount construction as defined in claim 1 in which said housing and said beam are formed of metal and in which rubber sheets are bonded to the top and bottom flanges of the beam in a position interposed between respectively the top and bottom walls of the housing.

5. Energy absorbing bumper mount construction as defined in claim 1 in which said energy absorbing members are first vulcanized bonded to the web of the beam, and then post-bonded to the housing surfaces.

6. Energy absorbing bumper mount construction as defined in claim 1 in which longitudinal movement of the beam within the housing will induce shear stress in the energy absorbing elastic members.

7. Energy absorbing bumper mount construction as defined in claim 2 in which said energy absorbing members have a trapezoidal shape in horizontal cross section and in which one of the opposite surfaces is greater in area than the other opposite surface.

8. Energy absorbing bumper mount construction as defined in claim 7 in which the surface of greater area is bonded to the web of the beam and the surface of lesser area is bonded to the inside surface of housing.

9. Energy absorbing bumper mount construction as defined in claim 8 in which longitudinal deflection of the beam in one direction will both induce shear stress in and compress said energy absorbing member.

10. Vehicle energy absorbing bumper mount construction including an elongated housing having top and bottom walls and opposite side walls, and open at each end, an elongated beam of generally H-shape cross section located within the housing and having a web portion spaced between the top and bottom housing walls, and flanges spaced closely adjacent to the opposite housing side walls, a portion of the beam extending from the interior a distance beyond one open end of the housing, the other end of the beam being located adjacent to the other open end of the housing, energy absorbing elastic members bonded to opposite surfaces of the web and to the inside surfaces of the top and bottom walls of the housing, the elastic members mounting the beam within the housing, means for attaching the housing to the frame of a vehicle, and means for attaching a vehicle bumper to the end of the beam extending beyond the interior of the housing.

11. Energy absorbing bumper mount construction as defined in claim 10 in which the energy absorbing members are rubber pads having two opposite surfaces, one of the surfaces on one of the pads being bonded to one web surface and the opposite surface of one of the pads being bonded to the inside surface of the top wall, and one of the surfaces of another pad being bonded to the opposite surface of the web, and the other surface of the other pad being bonded to the inside surface of the bottom wall of the housing.

12. Energy absorbing bumper mount construction as defined in claim 11 in which said energy absorbing members are a plurality of pairs of rubber pads spaced substantially along the length of the housing.

13. Energy absorbing bumper mount construction as defined in claim 10 in which said energy absorbing members are first bonded to the web of the beam and then post-bonded to the housing surface.

14. Energy absorbing bumper mount construction as defined in claim 11 in which abutment means are located at the end of the beam opposite the end carrying the bumper mounting means to permit movement of the beam from at-rest position in only one direction within the housing.

15. Energy absorbing bumper mount construction as defined in claim 14 in which said beam is movable from at-rest position only in a direction toward the housing open end located adjacent to the abutment means.

* * * * *